3,813,237
HERBICIDE

Adolf Fischer, Mutterstadt, Germany, assignor to Badische Anilin- & Soda-Fabrik Aktiengesellschaft, Ludwigshafen (Rhine), Germany
No Drawing. Filed July 9, 1970, Ser. No. 53,661
Claims priority, application Germany, July 17, 1969,
P 19 36 341.8
Int. Cl. A01n 9/24
U.S. Cl. 71—117                                  4 Claims

ABSTRACT OF THE DISCLOSURE

A mixture of a phenoxycarboxylic acid derivative and a biscarbamate or an acid anilide which has a good herbicidal action and a process for controlling unwanted plants in preemergence treatment with this mixture.

---

The present invention relates to a mixture of phenoxycarboxylic acid derivatives and biscarbamates or acid anilides having a good herbicidal action.

It is known to use substituted phenoxycarboxylic acids, diurethanes or acid anilides, a selective herbicidal agents; however, their action on weeds is not satisfactory.

We have now found that herbicides comprising a mixture of (a) a compound having the formula

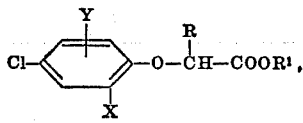

where X denotes chlorine or methyl, Y denotes chlorine or hydrogen, R denotes hydrogen or methyl and $R^1$ denotes hydrogen or an alkyl radical (methyl, ethyl, isooctyl, isobutyl) or an alkoxyalkyl radical (butyloxyethyl) or the salts of these compounds, and (b) a compound having the formula

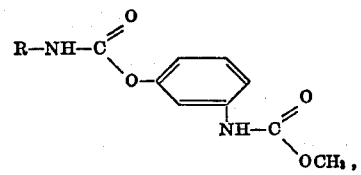

where R denotes hydrogen or haloalkyl (chloromethyl, bromoethyl, dichloropropyl, β-chloropropyl, 2,2-dimethyl-2-chloroethyl, 1,1-dimethyl-2-chloroethyl), or (c) a compound having the formula

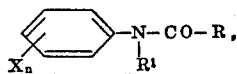

where X denotes thiocyano, halogen (F, Cl, Br, I), the nitro group, a trifluoromethyl or alkyl radical having 1 to 3 carbon atoms (methyl, ethyl, propyl, isopropyl) or an alkoxy radical (methoxyl, ethoxyl, propoxyl), R denotes an aliphatic radical having 1 to 4 carbon atoms (methyl, ethyl, propyl, isopropyl, butyl, sec-butyl, tert-butyl, allyl, propenyl, methyl propenyl, chloromethyl, dichloromethyl, trichloromethyl, α,α-dichloroethyl, α-chloroethyl, β-chloroethyl, α,α-dichlorobutyl, α,α-dibromobutyl, α,α-dimethyl-β-bromoethyl, cyclopropyl) which may be substituted by chlorine, bromine, fluorine, cyano or thiocyano, $R^1$ denotes an alkyl radical having 1 to 3 carbon atoms (methyl, ethyl, propyl, isopropyl) which may be substituted by halogen (F, Cl, Br, I) or $R^1$ denotes an alkynyl radical having 2 to 5 carbon atoms (ethynyl, propynyl, butynyl, pentynyl), and n denotes one of the integers 0, 1, 2 and 3, have a good herbicidal action when employed preemergence.

The special advantage of the mixtures according to the invention is that they have an excellent action when used preemergence on most monocotyledonous and dicotyledonous weeds.

By "used preemergence" we mean the application of the herbicides before the seedlings of the crop plants have thrust through the surface of the soil. The herbicides can therefore, either before or during sowing, be applied to the surface of the soil or evenly incorporated into the upper layer (down to about 5 cm.) of the soil. If the herbicides are applied after sowing, then at the latest shortly before the seedlings pierce the surface of the soil. Here, too, the herbicides may be applied to the surface of the soil or evenly incorporated into its upper layer.

The ratio of the individual components of the mixture to each other may vary within wide limits. It is, however, preferred to use a mixture of the individual active ingredients a:b or c in a weight ratio of from 3:1 to 1:5.

By salts we mean the alkali metal salts (potassium, sodium), the alkaline earth metal salts (calcium, magnesium) or the ammonium or amine salts (dimethylamine).

The herbicides according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, water, mineral oil fractions having a medium to high boiling point, such as kerosine or diesel oil, coal tar oils and oils of vegetable or animal origin, cyclic hydrocarbons such as tetrahydronaphthalene, and alkylated naphthalenes are suitable.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents. Concentrates which are suitable for dilution with water may be prepared from active ingredient, emulsifying or dispersing agent and possibly solvent.

Dusts may be prepared by mixing or grinding the active ingredients with a solid carrier.

The mixtures may be used alone or in admixture with insecticides, fungicides and fertilizers.

The following examples demonstrate the application of the herbicides according to the invention.

EXAMPLE 1

Loamy sandy soil is filled into pots and sown with the seeds of Zea mays, Sorghum vulgare, Setaria glauca, Dactylis glomerata, Poa annua, Lolium multiflorum, Echinochloa crus-galli, Chenopodium album and Raphanus raphanistrum. The soil prepared in this manner is then treated with the following individual active ingredients and mixtures thereof, each active ingredient and each mixture being dispersed or dissolved in 500 liters of water per hectare:

(I) dimethylamine salt of 2,4-dichlorophenoxyacetic acid, 1 and 4 kg. per hectare;
(II) dimethylamine salt of 2-(2-methyl-4-chlorophenoxy)-propione acid, 1 and 4 kg. per hectare;
(III) chloroacetic acid-N-butyn-(1)-yl-(3)-anilide, 3 and 4 kg. per hectare;
(IV) chloroacetic acid-N-3 - methylbutyn-(1)-yl-(3)-anilide, 3 and 4 kg. per hectare;
(V) chloroacetic acid-N - 3 - methylbutyn-(1)-yl-(3)-m-methylanilide, 3 and 4 kg. per hectare;

|         | Kg. per hectare |
|---------|-----------------|
| I+III   | 1+3             |
| I+IV    | 1+3             |
| I+V     | 1+3             |
| II+III  | 1+3             |
| II+IV   | 1+3             |
| II+V    | 1+3             |

It is ascertained after 3 to 4 weeks that, although the mixtures have the same good compatibility with crop plants as the individual active ingredients, the mixtures do have a superior overall herbicidal action.

The results of the experiment are given in the following table:

|  | Active ingredient | | | | | | | |
|---|---|---|---|---|---|---|---|---|
|  | I | | II | | III | | I+III | II+III |
| Kg./ha | 1.5 | 3 | 1.5 | 3 | 1.5 | 3 | 1.5+1.5 | 1.5+1.5 |
| Crop plants: | | | | | | | | |
| Zea mays | 0 | 10 | 0 | 10 | 0 | 10 | 0 | 0 |
| Sorghum vulgare | 0 | 20 | 0 | 55 | 0 | 10 | 0 | 0 |
| Unwanted plants: | | | | | | | | |
| Poa annua | 0 | 0 | 0 | 0 | 95 | 100 | 100 | 100 |
| Alopecurus myosuroides | 0 | 0 | 0 | 0 | 80 | 95 | 85 | 90 |
| Digitaria sanguinalis | 0 | 0 | 0 | 0 | 85 | 95 | 90 | 100 |
| Echinochloa crus-galli | 0 | 0 | 0 | 0 | 80 | 100 | 90 | 95 |
| Setaria viridis | 0 | 0 | 0 | 0 | 95 | 100 | 100 | 100 |
| Chenopodium album | 100 | 100 | 100 | 100 | 100 | 100 | 100 | 100 |
| Amarathus retroflexus | 80 | 95 | 80 | 95 | 90 | 100 | 100 | 100 |

NOTE.—0=No damage; 100=Complete destruction.

EXAMPLE 3

In a greenhouse, loamy sandy soil is filled into pots and sown with the seeds of Zea mays, Sorghum vulgare,

|  | Active ingredient | | | | | | | | | | | | | | |
|---|---|---|---|---|---|---|---|---|---|---|---|---|---|---|---|
|  | I | | II | | III | | IV | | V | | I+III | I+IV | I+V | II+III | II+IV | II+V |
| Kg./ha | 1 | 4 | 1 | 4 | 3 | 4 | 3 | 4 | 3 | 4 | 1+3 | 1+3 | 1+3 | 1+3 | 1+3 | 1+3 |
| Crop plants: | | | | | | | | | | | | | | | | |
| Zea mays | 0 | 20 | 0 | 20 | 0 | 0 | 0 | 0 | 0 | 0 | 0 | 0 | 0 | 0 | 0 | 0 |
| Sorghum vulgare | 0 | 25 | 0 | 30 | 0 | 0 | 0 | 0 | 0 | 0 | 0 | 0 | 0 | 0 | 0 | 0 |
| Unwanted plants: | | | | | | | | | | | | | | | | |
| Setaria glauca | 0 | 0 | 0 | 0 | 95 | 100 | 95 | 100 | 90 | 100 | 95 | 95 | 90 | 100 | 100 | 95 |
| Dactylis glomerata | 0 | 0 | 0 | 0 | 90 | 100 | 95 | 100 | 85 | 95 | 90 | 95 | 85 | 95 | 95 | 90 |
| Poa annua | 0 | 0 | 5 | 15 | 95 | 100 | 100 | 100 | 100 | 100 | 95 | 100 | 100 | 100 | 100 | 100 |
| Lolium multiflorum | 0 | 0 | 5 | 10 | 80 | 100 | 95 | 100 | 100 | 100 | 95 | 95 | 100 | 95 | 100 | 100 |
| Echinochloa crusgalli | 0 | 0 | 0 | 0 | 90 | 100 | 100 | 100 | 100 | 100 | 100 | 100 | 100 | 100 | 100 | 100 |
| Chenopodium album | 100 | 100 | 100 | 100 | 40 | 50 | 0 | 30 | 30 | 30 | 100 | 100 | 100 | 100 | 100 | 100 |
| Raphanus raphanistrum | 100 | 100 | 100 | 100 | 5 | 20 | 0 | 10 | 5 | 10 | 100 | 100 | 100 | 100 | 100 | 100 |

NOTE.—0=No damage; 100=Complete destruction.

EXAMPLE 2

Loamy sandy soil is filled into pots and sown with the seeds of Zea mays, Sorghum vulgare, Poa annua, Alopecurus myosuroides, Digitaria sanguinalis, Echinochloa crus-galli, Setaria viridis, Galium aparine, Chenopodium album and Amaranthus retroflexus. The soil prepared in this manner is then immediately treated with the following active ingredients and mixtures thereof, each active ingredient and each mixture being dispersed or dissolved in 500 liters of water per hectare:

(I) dimethylamine salt of 2,4-dichlorophenoxyacetic acid, 1.5 and 3 kg. per hectare;
(II) dimethylamine salt of 2-(2-methyl - 4 - chlorophenoxy)-propionic acid, 1.5 and 3 kg. per hectare;
(III) N-(1 - chloromethylpropyl)-carbamic acid-(m-carbomethoxyaminophenyl)-ester, 1.5 and 3 kg. per hectare

```
                                          Kg. per hectare
I+III  ------------------------------------ 1.5+1.5
II+III ------------------------------------ 1.5+1.5
```

It is ascertained after 3 weeks that, although the mixtures have the same good compatibility with crop plants as the individual active ingredients, the mixtures do have a superior herbicidal action.

Echinochloa crus-galli, Digitaria sanguinalis, Lolium perenne, Stellaria media and Sinapis arvensis. The soil is then treated with the following active ingredients and mixtures thereof, each active ingredient and each mixture being dispersed in 500 liters of water per hectare:

(I) α-(2,4-dichlorophenoxy)-propionic acid, 1 and 3 kg. per hectare;
(II) chloroacetic acid-N-isobutyn-(1)-ylanilide, 3 and 4 kg. per hectare;
(III) chloroacetic acid-N-3-methylbutyn-(1)-yl-(3)-anilide, 3 and 4 kg. per hectare;
(IV) chloroacetic acid - N-3-methylbutyn-(1)-yl-(3)-m-methylanilide, 3 and 4 kg. per hectare;

```
                                          Kg. per hectare
I+II   ------------------------------------ 1+3
I+III  ------------------------------------ 1+3
I+IV   ------------------------------------ 1+3
```

After 4 weeks, the mixtures show, compared with the individual active ingredients, a superior compatibility with the crop plants and exhibit an excellent herbicidal action.

The results of the experiment are given in the following table:

|  | Active ingredient | | | | | | | | | |
|---|---|---|---|---|---|---|---|---|---|---|
|  | I | | II | | III | | IV | | I+II | I+III | I+IV |
| kg./ha | 1 | 4 | 3 | 4 | 3 | 4 | 3 | 4 | 1+3 | 1+3 | 1+3 |
| Crop plants: | | | | | | | | | | | |
| Zea mays | 0 | 25 | 0 | 20 | 0 | 0 | 0 | 0 | 0 | 0 | 0 |
| Sorghum vulgare | 0 | 30 | 0 | 30 | 0 | 0 | 0 | 0 | 0 | 0 | 0 |
| Unwanted plants: | | | | | | | | | | | |
| Echinochloa crusgalli | 0 | 20 | 90 | 100 | 100 | 100 | 100 | 100 | 90 | 100 | 100 |
| Digitaria sanguinalis | 0 | 25 | 95 | 100 | 95 | 100 | 100 | 100 | 95 | 95 | 100 |
| Lolium perenne | 0 | 5 | 85 | 100 | 80 | 95 | 85 | 100 | 90 | 80 | 85 |
| Stellaria media | 80 | 100 | 5 | 10 | 0 | 5 | 5 | 15 | 90 | 85 | 90 |
| Sinapis arvensis | 90 | 100 | 10 | 30 | 0 | 15 | 10 | 20 | 100 | 90 | 100 |

NOTE.—0=No damage; 100=Complete destruction.

EXAMPLE 4

In a greenhouse, loamy sandy soil is filled into pots and sown with the seeds of Zea mays, Sorghum vulgare, Echinochloa crus-galli, Digitaria sanguinalis, Stellaria media and Galium aparine. The soil is then treated with the following active ingredients and mixtures thereof, each active ingredient and each mixture being dispersed in 500 liters of water per hectare:

(I) α-(2,4-dichlorophenoxy)-propionic acid, 1.5 and 3 kg. per hectare;
(II) N-(1-chloromethylpropyl)-carbamic acid-(m-carbomethoxyaminophenyl)-ester, 1.5 and 3 kg. per hectare;
(III) N-(1,1-dimethyl-2-chloroethyl)-carbamic acid-(m-carbomethoxyaminophenyl)-ester, 1.5 and 3 kg. per hectare;

|  | Kg. per hectare |
|---|---|
| I+II | 1.5+1.5 |
| I+III | 1.5+1.5 |

After 3 to 4 weeks, the mixtures, compared with the individual active ingredients, exhibit a good herbicidal action and have good crop plant compatibility.

The results of the experiment are given in the following table:

|  | Active ingredient |  |  |  |  |  |  |
|---|---|---|---|---|---|---|---|
|  | I |  | II |  | III |  | I+II | I+III |
| Kg./ha | 1.5 | 3 | 1.5 | 3 | 1.5 | 3 | 1.5+1.5 | 1.5+1.5 |
| Crop plants: | | | | | | | | |
| Zea mays | 0 | 10 | 0 | 10 | 0 | 5 | 0 | 0 |
| Sorghum vulgare | 0 | 20 | 0 | 10 | 0 | 10 | 0 | 0 |
| Unwanted plants: | | | | | | | | |
| Echinochloa crus-galli | 0 | 0 | 80 | 100 | 80 | 90 | 80 | 80 |
| Digitaria sanguinalis | 0 | 0 | 85 | 95 | 80 | 90 | 85 | 80 |
| Stellaria media | 80 | 100 | 70 | 80 | 65 | 80 | 100 | 100 |
| Galium aparine | 75 | 90 | 40 | 80 | 30 | 70 | 100 | 100 |

NOTE.—0=No damage; 100=Complete destruction.

The action of the following mixtures corresponds to that of I+II and I+III:

2,4,5-trichlorophenoxyacetic acid+N-(1-chloromethylpropyl)-carbamic acid-(m-carbomethoxyaminophenyl)-ester;
α-(2,4,5-trichlorophenoxy)-propionic acid+N-(1-chloromethylpropyl)-carbamic acid-(m-carbomethoxyaminophenyl)-ester;
2,4,5-trichlorophenoxyacetic acid+N-(1,1-dimethyl-2-chloroethyl)-carbamic acid-(m-carbomethoxyaminophenyl)-ester;
α-(2,4,5-trichlorophenoxy)-propionic acid+N-(1,1-dimethyl-2-chloroethyl)-carbamic acid-(m-carbomethoxyaminophenyl)-ester;
2-methyl-4-chlorophenoxyacetic acid+chloroacetic acid-N-isobutyn-(1)-ylanilide;
2-methyl-4-chlorophenoxyacetic acid+chloroacetic acid-N-3-methylbutyn-(1)-yl-(3)-anilide;
2-methyl-4-chlorophenoxyacetic acid+chloroacetic acid-N-3-methylbutyn-(1)-yl-(3)-m-methylanilide;
2-methyl-4-chlorophenoxyacetic acid+N-(1-chloromethylpropyl)-carbamic acid-(m-carbomethoxyaminophenyl)-ester.

EXAMPLE 5

Loamy sandy soil is filled into pots and sown with the seeds of Zea mays, Sorghum vulgare, Setaria glauca, Dactylis glomerata, Poa annua, Lolium multiflorum, Echinochloa crus-galli, Chenopodium album and Raphanus rephanistrum. The soil prepared in this manner is then treated with the following active ingredients and mixtures thereof, each active ingredient and each mixture being dispersed in 500 liters of water per hectare:

(I) 2,4-dichlorophenoxyacetic acid, 0.5, 1, 3 and 6 kg. per hectare;
(II) 2-(2-methyl-4-chlorophenoxy)-propionic acid, 1, 2, 5 and 6 kg. per hectare;
(III) chloroacetic acid-N-butyn-(1)-yl-(3)-anilide, 2.5, 3 and 5 kg. per hectare;
(IV) chloroacetic acid - N - 3 - methylbutyn-(1)-yl-(3)-anilide, 5 and 6 kg. per hectare;
(V) chloroacetic acid - N - 3 - methylbutyn-(1)-yl-(3)-m-methylanilide, 5 and 6 kg. per hectare;

|  | Kg. per hectare |
|---|---|
| I+III | 0.5+2.5 |
| I+IV | 1+5 |
| I+V | 1+5 |
| II+III | 2+3 |
| II+IV | 1+5 |
| II+V | 1+5 |

After 3 to 4 weeks, it is ascertained that the mixtures have the same good compatibility as the individual active ingredients with the crop plants, but a superior herbicidal action.

The results of the experiment are given in the following table:

|  | Active ingredient | | | | | | | | | | | | | | | | | |
|---|---|---|---|---|---|---|---|---|---|---|---|---|---|---|---|---|---|---|
|  | I | | | II | | | | III | | | IV | | V | | I+III | I+IV | I+V | II+III | II+IV | II+V |
| Kg./ha | 0.5 | 1 | 3 | 6 | 1 | 2 | 5 | 6 | 2.5 | 3 | 5 | 5 | 6 | 5 | 6 | 0.5+2.5 | 1+5 | 1+5 | 2+3 | 1+5 | 1+5 |
| Crop plants: | | | | | | | | | | | | | | | | | | | | | |
| Zea may | 0 | 0 | 10 | 35 | 0 | 0 | 30 | 35 | 0 | 0 | 0 | 0 | 10 | 0 | 10 | 0 | 0 | 0 | 0 | 0 | 0 |
| Sorghum vulgare | 0 | 0 | 20 | 40 | 0 | 0 | 30 | 50 | 0 | 0 | 0 | 0 | 50 | 0 | 10 | 0 | 0 | 0 | 0 | 0 | 0 |
| Unwanted plants: | | | | | | | | | | | | | | | | | | | | | |
| Stellaria glauca | 0 | 0 | 0 | 20 | 0 | 0 | 15 | 20 | 90 | 95 | 100 | 100 | 500 | 100 | 100 | 90 | 100 | 100 | 95 | 100 | 100 |
| Dactylis glomerata | 0 | 0 | 0 | 10 | 0 | 0 | 15 | 20 | 85 | 90 | 100 | 100 | 100 | 100 | 100 | 85 | 100 | 100 | 90 | 100 | 100 |
| Poa annua | 0 | 0 | 0 | 20 | 0 | 5 | 20 | 30 | 90 | 95 | 100 | 100 | 100 | 100 | 100 | 90 | 100 | 100 | 100 | 100 | 100 |
| Lolium multiflorum | 0 | 0 | 0 | 10 | 0 | 5 | 20 | 30 | 80 | 80 | 90 | 100 | 500 | 100 | 100 | 80 | 100 | 100 | 90 | 100 | 100 |
| Echinochloa crus-galli | 0 | 0 | 0 | 20 | 0 | 0 | 0 | 20 | 85 | 90 | 100 | 100 | 100 | 100 | 100 | 85 | 100 | 100 | 90 | 100 | 100 |
| Chenopodium album | 80 | 100 | 100 | 100 | 100 | 100 | 100 | 100 | 35 | 40 | 60 | 40 | 40 | 40 | 60 | 100 | 100 | 100 | 100 | 100 | 100 |
| Raphanus raphanistrum | 80 | 100 | 100 | 100 | 100 | 100 | 100 | 100 | 0 | 5 | 15 | 20 | 40 | 20 | 40 | 80 | 100 | 100 | 100 | 100 | 100 |

NOTE.—0=No damage; 100=Complete destruction.

EXAMPLE 6

Loamy sand soil is filled into pots and sown with the seeds of Zea mays, Sorghum vulgare, Triticum vulgare, Poa annua, Alopecurus myosuroides, Digitaria sanguinalis, Echinochloa crus-galli, Setaria viridis, Galeopsis sp. and Amaranthus retroflexus. The soil is then immediately treated with the following active ingredients and mixtures thereof, each active ingredient and each mixture being dispersed in 500 liters of water per hectare:

(I) dimethylamine salt of 2,4 - dichlorophenoxyacetic acid, 1, 2 and 3 kg. per hectare;
(II) sodium salt of 2-methyl-4-chlorophenoxyacetic acid, 1, 2, and 3 kg. per hectare;
(III) N - (1 - chloromethylpropyl) - carbamic acid-(3'-carbomethoxyaminophenyl)-ester, 1, 2 and 3 kg. per hectare;

|  | Kg. per hectare |
|---|---|
| I+III | 1+2, 2+1 |
| II+III | 1+2, 2+1 |

After 3 weeks, it is ascertained that the mixtures, compared with the individual active ingredients, have a superior herbicidal action and good compatibility with the crop plants.

The results of the experiment are given in the following:

|  | Active ingredient | | | | | | | | | | | | | |
|---|---|---|---|---|---|---|---|---|---|---|---|---|---|---|
|  | I | | | II | | | III | | | I+III | | II+III | | |
| Kg./ha | 1 | 2 | 3 | 1 | 2 | 3 | 1 | 2 | 3 | 1+2 | 2+1 | 1+2 | 2+1 | |
| Crop plant: | | | | | | | | | | | | | | |
| Zea mays | 0 | 0 | 10 | 0 | 0 | 10 | 0 | 0 | 10 | 0 | 0 | 0 | 0 | |
| Sorghum vulgare | 0 | 10 | 20 | 0 | 10 | 15 | 0 | 0 | 10 | 0 | 10 | 0 | 10 | |
| Triticum vulgare | 0 | 0 | 15 | 0 | 0 | 15 | 0 | 0 | 15 | 0 | 0 | 0 | 0 | |
| Unwanted plants: | | | | | | | | | | | | | | |
| Poe annua | 0 | 0 | 0 | 0 | 0 | 0 | 90 | 95 | 100 | 95 | 90 | 95 | 90 | |
| Alopecurus myosuroides | 0 | 0 | 0 | 0 | 0 | 0 | 80 | 90 | 95 | 90 | 80 | 90 | 80 | |
| Digitaria sanguinalis | 0 | 0 | 0 | 0 | 0 | 0 | 80 | 90 | 95 | 90 | 80 | 90 | 80 | |
| Echinochloa crus-galli | 0 | 0 | 0 | 0 | 0 | 0 | 80 | 90 | 100 | 90 | 80 | 90 | 80 | |
| Setaria viridis | 0 | 0 | 0 | 0 | 0 | 0 | 90 | 95 | 100 | 95 | 90 | 95 | 90 | |
| Galeopsis sp | 80 | 100 | 100 | 80 | 100 | 100 | 30 | 50 | 70 | 100 | 100 | 100 | 100 | |
| Amaranthus retroflexus | 75 | 90 | 95 | 75 | 90 | 95 | 90 | 95 | 100 | 100 | 100 | 100 | 100 | |

NOTE.—0=No damage; 100=Complete destruction.

EXAMPLE 7

In a greenhouse, loamy sandy soil is filled into pots and sown with the seeds of Zea mays, Sorghum vulgare, Echinochloa crus-galli, Digitaria sanguinalis, Lolium perenne, Stellaria media and Sinapis arvensis. The soil is then treated with the following active ingredients and mixtures thereof, each active ingredient and each mixture being dispersed in 500 liters of water per hectare:

(I) 2-(2,4-dichlorophenoxy)-propionic acid, 0.5, 1, 3 and 6 kg. per hectare;
(II) chloroacetic acid-N-butyn-1-yl-3-anilide, 2.5 and 3 kg. per hectare;
(III) N-3-methylbutyn-(1)-yl-3-chloroacet-anilide, 5 and 6 kg. per hectare;
(IV) N-(3-methylbutyn - 1 - yl-3)-chloroacetic acid-m-methylanilide, 5 and 6 kg. per hectare;

(I) 2-(2,4-dichlorophenoxy)-propionic acid, 0.5, 1, 2 and 3 kg. per hectare;
(II) 2-(4-chloro-2-methylphenoxy)-propionic acid, 0.5, 1, 2 and 3 kg. per hectare;
(III) N-(1-chloromethylpropyl) - carbamic acid-(3'-carbomethoxyaminophenyl)-ester, 1, 1.5, 2 and 3 kg. per hectare;

Kg. per hectare
I+III ------------------------- 2+1, 1+2, 0.5+1.5
II+III ------------------------ 2+1, 1+2, 0.5+2.5

After 3 to 4 weeks, it is ascertained that the mixtures have the same good compatibility with crop plants as the individual active ingredients, but a superior herbicidal action.

The results of the experiment are given in the following table:

|  | Active ingredient | | | | | | | | | | | | | | | | | |
|---|---|---|---|---|---|---|---|---|---|---|---|---|---|---|---|---|---|---|
|  | I | | | | II | | | | III | | | | I+III | | | II+III | | |
| Kg./ha | 0.5 | 1 | 2 | 3 | 0.5 | 1 | 2 | 3 | 1 | 1.5 | 2 | 3 | 2 | 1 | 0.5 | 2 | 1 | 0.5 |
| Crop plants: | | | | | | | | | | | | | | | | | | |
| Zea mays | 0 | 0 | 0 | 10 | 0 | 0 | 0 | 10 | 0 | 0 | 0 | 10 | 0 | 0 | 0 | 0 | 0 | 0 |
| Sorghum vulgare | 0 | 0 | 10 | 20 | 0 | 0 | 0 | 15 | 0 | 0 | 0 | 10 | 10 | 0 | 0 | 0 | 0 | 0 |
| Unwanted plants: | | | | | | | | | | | | | | | | | | |
| Echinochlo crusgalli | 0 | 0 | 0 | 10 | 0 | 0 | 0 | 0 | 80 | 85 | 90 | 100 | 80 | 90 | 85 | 80 | 90 | 85 |
| Digitaria sagunalis | 0 | 0 | 0 | 10 | 0 | 0 | 0 | 0 | 80 | 85 | 90 | 95 | 80 | 90 | 85 | 80 | 90 | 85 |
| Stellaria media | 70 | 80 | 90 | 100 | 70 | 80 | 95 | 100 | 60 | 70 | 80 | 90 | 100 | 100 | 100 | 100 | 100 | 100 |
| Galium aparine | 60 | 70 | 80 | 90 | 60 | 70 | 80 | 90 | 20 | 30 | 40 | 70 | 100 | 100 | 100 | 100 | 100 | 95 |

NOTE.—0=No damage; 100=Complete destruction.

Kg. per hectare
I+II ---------------------------------- 0.5+2.5
I+III --------------------------------- 1+5
I+IV ---------------------------------- 1+5

After 4 weeks, it is ascertained that the mixtures have a herbicidal action superior to that of the individual active ingredients.

The results of the experiment are given in the following table:

EXAMPLE 9

In a greenhouse, loamy sandy soil is filled into pots and sown with the seeds of Zea mays, Echinochloa crus-galli, Poa annua, Galium aparine and Matricaria chamomilla. The soil is then treated with the following active ingredients and mixtures thereof, each active ingredient and each mixtures being dispersed in 500 liters of water per hectare:

|  | Active ingredient | | | | | | | | | | | |
|---|---|---|---|---|---|---|---|---|---|---|---|---|
|  | I | | | | II | | III | | IV | | I+II | I+III | I+IV |
| Kg./ha | 0.5 | 1 | 3 | 6 | 2.5 | 3 | 5 | 6 | 5 | 6 | 0.5+2.5 | 1+5 | 1+5 |
| Crop plants: | | | | | | | | | | | | | |
| Zea mays | 0 | 0 | 10 | 40 | 0 | 0 | 0 | 10 | 0 | 10 | 0 | 0 | 0 |
| Sorghum vulgare | 0 | 0 | 20 | 60 | 0 | 0 | 0 | 10 | 0 | 10 | 0 | 0 | 0 |
| Unwanted plants: | | | | | | | | | | | | | |
| Echinochloa crus-galli | 0 | 0 | 10 | 40 | 85 | 90 | 100 | 100 | 100 | 100 | 85 | 100 | 100 |
| Digitaria sanguinalis | 0 | 0 | 10 | 40 | 90 | 95 | 100 | 100 | 100 | 100 | 90 | 100 | 100 |
| Lolium perenne | 0 | 0 | 0 | 20 | 80 | 85 | 100 | 100 | 100 | 100 | 80 | 100 | 100 |
| Stellaria media | 70 | 80 | 100 | 100 | 0 | 5 | 20 | 30 | 30 | 40 | 70 | 100 | 100 |
| Sinapis arvensis | 80 | 90 | 100 | 100 | 5 | 10 | 30 | 40 | 30 | 40 | 90 | 100 | 100 |

NOTE.—0=No damage; 100=Complete destruction.

EXAMPLE 8

In a greenhouse, loamy sandy soil is filled into pots and sown with the seeds of Zea mays, Sorghum vulgare, Echinochloa crus-galli, Digitaria sanguinalis, Stellaria media and Galium aparine. The soil is then treated with the following active ingredients and mixtures thereof, each active ingredient and each mixture being dispersed in 500 liters of water per hectare:

(I) potassium salt of 2,4,5-trichlorophenoxyacetic acid, 1, 3 and 4 kg. per hectare;
(II) isooctyl α-(2,4,5-trichlorophenoxy)-propionate, 0.5, 2 and 3 kg. per hectare;

(III) N-(1-chloromethylpropyl) - carbamic acid-(3'-carbomethoxyaminophenyl)-ester, 1.5, 2 and 3 kg. per hectare;
(IV) chloroacetic acid-N-butyn-1-yl-3-anilide, 2.5, 3 and 4 kg. per hectare;

| | Kg. per hectare |
|---|---|
| I+III | 1+2 |
| I+IV | 1+3 |
| II+III | 0.5 to 1.5 |
| II+IV | 0.5+2.5 |

After 4 to 5 weeks, the following results are obtained:

| | Active ingredient | | | | | | | | | | | | | | |
|---|---|---|---|---|---|---|---|---|---|---|---|---|---|---|---|
| | I | | | II | | | III | | | IV | | | I+III | I+IV | II+III | II+IV |
| Kg./ha | 1 | 3 | 4 | 0.5 | 2 | 3 | 1.5 | 2 | 3 | 2.5 | 3 | 4 | 1+2 | 1+3 | 0.5+1.5 | 0.5+2.5 |
| Crop plant: Zea mays | 0 | 20 | 30 | 0 | 20 | 30 | 0 | 0 | 10 | 0 | 0 | 0 | 0 | 0 | 0 | 0 |
| Unwanted plants: | | | | | | | | | | | | | | | | |
| Echinochloa -crus-galli | 0 | 10 | 20 | 0 | 10 | 30 | 80 | 90 | 100 | 85 | 90 | 100 | 95 | 90 | 80 | 80 |
| Poa annua | 0 | 10 | 20 | 0 | 10 | 30 | 95 | 95 | 100 | 90 | 95 | 100 | 100 | 95 | 95 | 90 |
| Galium aparine | 30 | 50 | 70 | 70 | 100 | 100 | 30 | 40 | 70 | 10 | 15 | 25 | 80 | 50 | 100 | 89 |
| Matricaria chmomilla | 80 | 100 | 100 | 75 | 100 | 100 | 60 | 80 | 100 | 40 | 50 | 60 | 100 | 100 | 100 | 100 |

NOTE.—0=No damage; 100=Complete destruction.

We claim:
1. A herbicide for preemergence application consisting essentially of a mixture of
   (a) 2,4-dichlorophenoxyacetic acid or a salt thereof, and
   (b) a compound having the formula

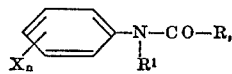

wnerein X is methyl, $n$ is 0 or 1, R is chloroalkyl having 1-3 carbon atoms and $R^1$ is butynyl or methylbutynyl in a weight ratio of $a$ to $b$ in the range of 3:1 to 1:5.

2. A herbicide as claimed in claim 1 wherein compound $a$ is 2,4-dichlorophenoxyacetic acid and compound $b$ is chloroacetic acid-N-butyn-(1)-yl-(3)-anilide.

3. A process for controlling the growth of unwanted plants wherein the plants or the soil in which the growth of the plants is to be prevented are treated with a mixture consisting essentially of
   (a) 2,4-dichlorophenoxyacetic acid or a salt thereof, and
   (b) a compound having the formula

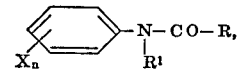

wherein X is methyl, $n$ is 0 or 1, R is chloroalkyl having 1-3 carbon atoms and $R^1$ is butynyl or methylbutynyl in a weight ratio of $a$ to $b$ in the range of 3:1 to 1:5.

4. A process as claimed in claim 3 wherein compound $a$ is 2,4-dichlorophenoxyacetic acid and compound $b$ is chloroacetic acid-N-butyn-(1)-yl-(3)-anilide.

References Cited
UNITED STATES PATENTS
| | | | |
|---|---|---|---|
| 3,133,808 | 5/1964 | Hamm | 71—117 X |
| 3,345,151 | 10/1967 | Olin | 71—117 X |
| 3,535,377 | 10/1970 | Steinbrunn et al. | 71—118 X |

FOREIGN PATENTS
| | | | |
|---|---|---|---|
| 4,012,197 | 6/1965 | Japan | 71—118 |

JAMES O. THOMAS, JR., Primary Examiner

U.S. Cl. X.R.

71—104. 105. 108, 109, 116, 118